United States Patent [19]
Rudert, Jr. et al.

[11] Patent Number: 5,428,552
[45] Date of Patent: Jun. 27, 1995

[54] DATA COMPACTION TECHNIQUES FOR GENERATION OF A COMPLEX IMAGE

[75] Inventors: John R. Rudert, Jr., Fishkill; Robert A. Simpson, Wappingers Falls, both of N.Y.

[73] Assignee: International Business Machines Corporation, Armonk, N.Y.

[21] Appl. No.: 238,348

[22] Filed: May 5, 1994

Related U.S. Application Data

[63] Continuation of Ser. No. 774,535, Oct. 8, 1991, abandoned.

[51] Int. Cl.6 .............................................. G06F 15/60
[52] U.S. Cl. .................................. 364/491; 364/488; 364/489; 364/490; 364/468; 250/491.1; 250/492.2; 250/398
[58] Field of Search ................ 364/488, 489, 490, 491, 364/200, 521, 571.01, 520, 724.05, 724.1, 731, 474.02; 250/396 R, 398, 492.2, 491.1; 358/403, 426, 428, 470, 384, 429, 433; 382/41, 46, 44, 54

[56] References Cited

U.S. PATENT DOCUMENTS

| | | | |
|---|---|---|---|
| 3,900,736 | 8/1975 | Michail et al. | 250/492 |
| 4,051,381 | 9/1977 | Trotel | 250/492 |
| 4,051,457 | 9/1977 | Inose et al. | 340/146.3 |
| 4,259,724 | 3/1981 | Sugiyama | 364/491 |
| 4,291,231 | 9/1981 | Kawashima et al. | 250/492 |
| 4,387,433 | 6/1983 | Cardenia et al. | 364/491 |
| 4,433,384 | 2/1984 | Berrian et al. | 364/525 |
| 4,451,825 | 5/1984 | Hall et al. | 340/750 |
| 4,468,566 | 8/1984 | Eichhorn et al. | 250/492.2 |
| 4,482,810 | 11/1984 | Cooke | 364/490 |
| 4,511,980 | 4/1985 | Watanabe | 364/491 |
| 4,531,191 | 7/1985 | Koyama | 364/491 |
| 4,532,598 | 7/1985 | Shibayama et al. | 364/491 |
| 4,538,232 | 8/1985 | Koyama | 364/491 |
| 4,586,141 | 4/1986 | Yasuda et al. | 364/490 |
| 4,647,924 | 3/1987 | Naqib | 340/756 |
| 4,677,575 | 6/1987 | Redin | 364/521 |
| 4,718,019 | 1/1988 | Fillion et al. | 364/491 |
| 4,744,047 | 5/1988 | Okamoto et al. | 364/900 |
| 4,853,870 | 8/1989 | Yasutake et al. | 364/490 |
| 4,950,910 | 8/1990 | Yasuda et al. | 250/492.3 |
| 4,996,434 | 2/1991 | Tanaka | 250/492.3 |
| 5,008,830 | 4/1991 | Moriizumi et al. | 364/490 |
| 5,079,717 | 1/1992 | Miwa | 364/490 |
| 5,083,032 | 1/1992 | Suzuki | 250/492.2 |
| 5,086,398 | 2/1992 | Moriizumi | 364/490 |
| 5,251,140 | 10/1993 | Chung et al. | 364/491 |
| 5,267,177 | 11/1993 | Sato et al. | 364/491 |
| 5,337,247 | 8/1994 | Hamaguchi | 364/490 |

OTHER PUBLICATIONS

R. D. Moore and P. M. Ryan, Personalization of ROS Memories Using An E-Beam System, IBM Technical Disclosure Bulletin, Jul. 1977.

European Search Report;-Nagahashi, et al.; "A Pattern Description and Generation Method of Structural Characters"; IEEE Transactions on Pattern Analysis and Machine Intelligence, vol. PAMI-8, No. 1, Jan. 1986; pp. 112–118.

*Primary Examiner*—Kevin J. Teska
*Assistant Examiner*—Jacques H. Louis-Jacques
*Attorney, Agent, or Firm*—Whitham, Curtis, Whitham and McGinn; Charles W. Peterson, Jr.

[57] ABSTRACT

A data compaction technique permits electron beam lithography systems to operate more efficiently in the fabrication of complex computer chips. One or more building block patterns are selected for the design to be encoded. Each shape in the set of building block patterns is given a sequence number for use in a data word for the design. The set of shape descriptors for each block is stored in a reference memory. The data word referencing a block includes a number of bytes which specify the stored block pattern data and control bits corresponding to sequence numbers of the pattern shapes in a maximum shape configuration. Each shape is assigned a bit according to its sequence number.

8 Claims, 9 Drawing Sheets

C = COMMON SHAPES ALWAYS EXPOSED $O_1$ $O'_1$ = ALTERNATE POSITION FOR OUTPUT PAD. SHAPE 14 AND SHAPES 15, 16 MUTUALLY EXCLUSIVE.

DATA FOR CKT. 1

| 1 | 0 | 0 | 1 | 0 | 1 | 1 | 0 |

DATA FOR CKT. 2

| 1 | 1 | 1 | 1 | 1 | 1 | 0 | 1 |
BIT 1   2   3   4   5   6   7   8

DATA COMPACTION TECHNIQUES FOR GENERATION OF A COMPLEX IMAGE

CROSS-REFERENCE TO RELATED APPLICATION

This application is a continuation of application Ser. No. 07/774,535 filed Oct. 8, 1991, now abandoned.

BACKGROUND OF THE INVENTION

1. Field of the Invention

The present invention generally relates to techniques that allow significant compaction of the data used to describe a design which lacks repetition and, more particularly, to an effective data compaction technique for the generation of complex computer images. The invention has particular application in electron beam lithography for the fabrication of complex integrated circuit structures.

2. Description of the Prior Art

The amount of data required to describe the patterns to be written by an electron beam (e-beam) lithography system for complex integrated circuit (IC) structures such as advanced computer chips, read only storage (ROS), programmable logic arrays (PLAs), and other array structures, is enormous, typically requiring gigabytes (GBs) of data. Generally, the pattern data is not compacted because the patterns lack the repetition needed by step-and-repeat, macro commands and other known compaction methods. This results in excessive data volumes and post processing times for such designs.

R. D. Moore and P. M. Ryan in "Personalization of ROS Memories Using an E-Beam System", IBM Technical Disclosure Bulletin, vol. 20, no. 2., July 1977, pp. 588, 589, describe a method for improving writing speed for a rigidly defined ROS array where the exposure locations and pattern (single spot) and pattern length are fixed and the exposure data is not compacted.

U.S. Pat. No. 4,291,231 to Kawashima et al. for "Electron Beam Exposure System and Apparatus for Carrying Out the Same" describes a system using fixed patterns stored in memory to provide repeated exposure of the same pattern sequence at various locations. The pattern consists of the same sequence of pattern elements repeated over and over. It does not allow individual selection of pattern elements.

U.S. Pat. No. 4,259,724 to Sugiyama, like the patent to Kawashima et al., allows step and repeat exposures of a pattern segment (i.e., a fixed string of shapes) with an elementary repetitive pattern in a rectangular area which may consist of a number of fractional patterns.

U.S. Pat. No. 4,531,191 to Koyama provides for monitoring of the input data string to detect repeated data sequences and generates a repeat count used during actual exposure. In the Koyama system, repeated sequences must occur in succession.

U.S. Pat. No. 4,051,457 to Inose et al. discloses a system which increases the speed by which codes for Chinese characters are interpreted and the address for the string of shapes needed to write the character is obtained.

None of the foregoing patents disclose a system that would allow variations of the basic pattern at each exposure location; that is, they do not allow for selective exposure of shapes within a string.

SUMMARY OF THE INVENTION

It is therefore a general object of the present invention to provide a method of compacting the data required to generate complex images by a computer.

It is another, more specific object of the invention to provide a technique for the compaction of patterns in the manufacture of advanced computer chips despite the fact that the overall designs lack repetition because of personalization of the chips.

According to the invention, a pattern is segmented into numerous blocks with each block including an identical grid pattern of predetermined potential shapes for specific locations within each block. The blocks do not have to be uniform and can be of different sizes and shapes. The shapes within a block do not have to fit into different areas and can overlap. There can be a number of different selectable alternatives for an area in the block which are mutually exclusive, and there can be several differently shaped shapes which can go at the same x,y coordinates for different applications or functions.

Each of the set of shapes, which fits into a different area of the grid pattern of a given block, is stored in memory and each is given a sequence number. Each of the shapes with that sequence number is placed at a predetermined location in the grid pattern for a given block. Each shape for that predetermined location is different, but it can be of the same dimensions as a pattern for other locations within the block. The shapes are adapted in terms of their ratio of length to width and scale to contribute a particular shape to a predetermined location in a grid pattern. In that way, each shape, when present, adds a different feature to its area of the grid pattern.

One or more standard building blocks is selected for the design to be encoded. Each shape in a block is given a sequence number for use in a data word for the building block. The set of shape descriptors for each block is stored in a reference memory. The data word referencing a block includes a number of bytes which specify the stored shape data for the block, and data words encode which shapes in the pattern are to be included or excluded. Each shape is assigned a bit according to its sequence number. For a given shape, if it is to be included, it is a binary "1", and if it is to be excluded, it is a binary "0". Each standard shape to fit into a block has a set of parameters which are stored in memory. They include the $\Delta x_n$ and $\Delta y_n$ offsets from a reference location x,y plus the width $w_n$ and height $h_n$, where n equals the sequence number of the shape. Patterns can be placed in any sequence at random, making it possible to provide a large number of patterns with far less processing of data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
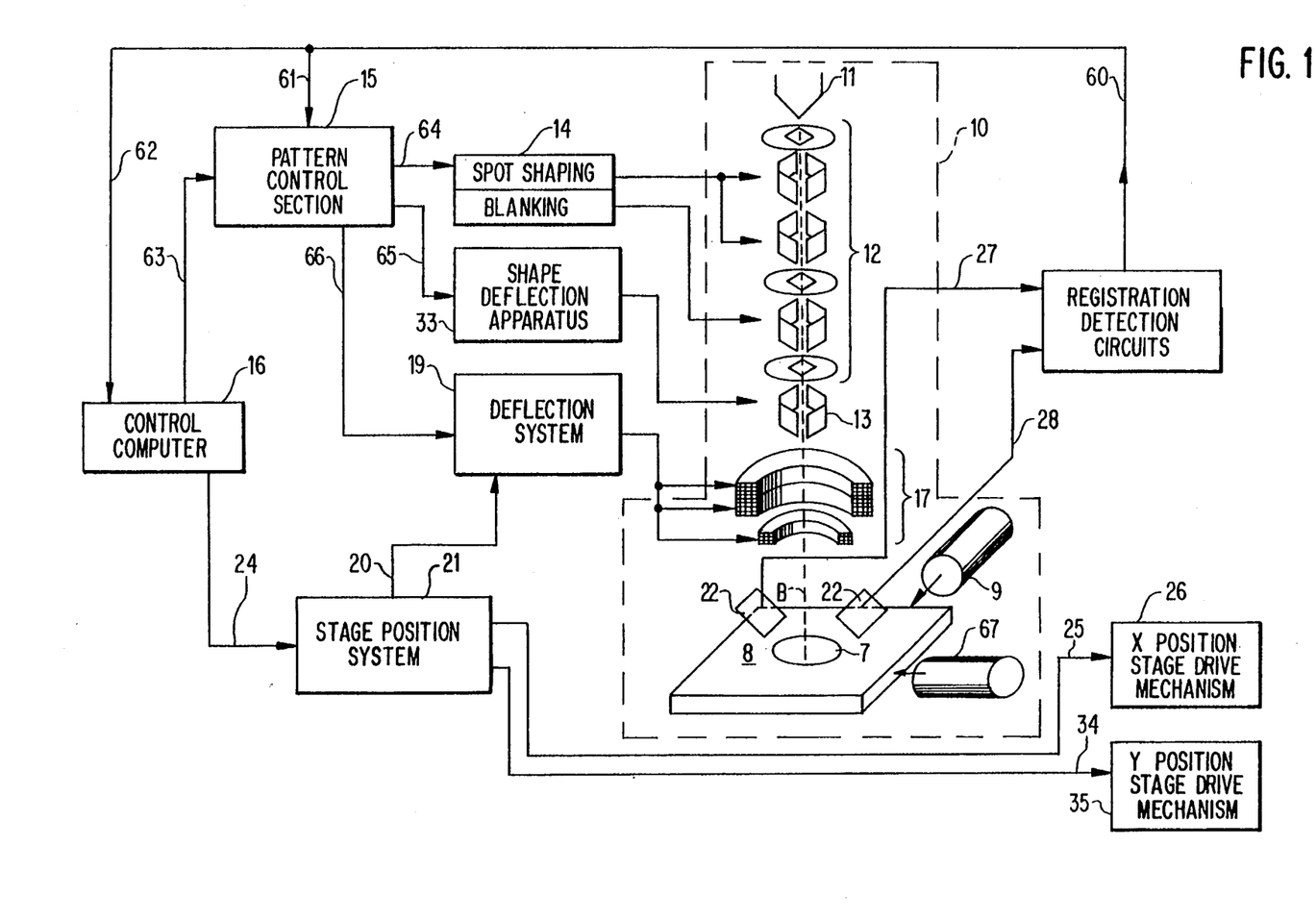
FIG. 1 is a block diagram of the electron beam exposure system according to a preferred embodiment of the invention.

Referring now to the drawings, and more particularly to FIG. 1, there is shown an e-beam system of the type in which a preferred embodiment of the invention is implemented. An x-y work table 8 is moved beneath an electron beam B. The work table 8 carries a target 7, which is typically a semiconductor substrate. An electron beam exposure system is indicated generally by the phantom line 10. An electron beam source 11 produces a beam B which is shaped into various spot shapes and blanked by the deflection and aperture apparatus 12, under the control of spot shaping apparatus, both located in spot shaping, blanking analog electronics unit 14 according to Michail et al. in U.S. Pat. No. 3,900,736. The positioned and shaped spot is controlled, in part, by unit 14 under the control of digital electronics in pattern control section 15. This determines the pattern written in the sub-field under the control of the control computer 16, again according to Michail et al., supra.

Pattern control section 15 supplies signals on line 64 to spot shaping, blanking and analog electronics unit 14, on line 65 to shape deflection apparatus 33 and on line 66 to deflection system 19, to control beam position, spot shaping and beam on/off control in a well-known manner. The beam is shaped by the deflection and aperture apparatus 12, positioned over short distances by deflection plates 13 and positioned over longer ranges by deflection coils 17.

The next field is positioned orthogonally with respect to the direction of motion of the x-y drive work table 8 which supports the substrate 7, under control of the stage position measurement system 21. All operations are under direction of the control computer 16. The writing of patterns is temporarily stopped after writing at a chip position on substrate 7 has been completed, and a reregistration cycle on substrate 7 is initiated. The beam B is deflected to the nominal location of four registration marks for the next field on substrate 7, and four areas are scanned by the electron beam. The actual positions of the registration marks are determined by detection of backscattered electrons which strike detectors 22. The signals from detectors 22 are fed on lines 27 and 28 to registration detection circuits 23 to determine the actual next field position which provides a signal on lines 60 and 61 to pattern control section 15, and on lines 60 and 62 to the control computer 16. The designed chip position is supplied from control computer 16 on line 63 to the pattern control section 15. In pattern control section 15, the values on lines 63 and 61, i.e., the designed field position and the actual position, are compared, and corrections are applied on line 65 to the vector deflection apparatus 33. The registration cycle is alternated with writing cycles until the final chip location is exposed.

The x-axis work table positioning is controlled by an x position signal included in an x/y position signal on line 24 from control computer 16 to stage position measurement system 21. The signal on line 24 is predetermined by wafer specifications stored in the form of position control data in control computer 16 as modified by current registration signals received via lines 60 and 62 from registration detection circuits 23. The actual x position of work table 8 is determined by stage position measurement system 21, and that value is compared to the desired x position signal on line 24 from control computer 16. A resulting position error signal on line 25 is applied to a servo apparatus in the x stage drive mechanism 26 which applies a drive signal to motor 67. The y-axis work table positioning is similarly controlled by a servo apparatus in the Y stage drive mechanism 35 which responds to a signal on line 34 from the stage position measurement system 21.

Figure 2A:
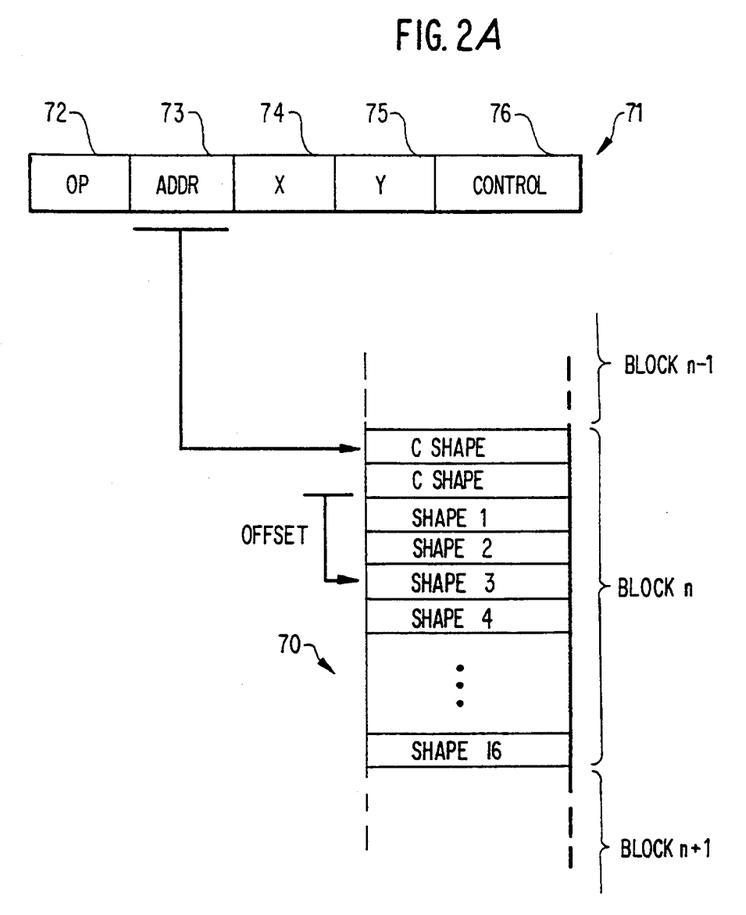
FIG. 2A is a block diagram showing the addressing of the reference memory, which is a modification to the existing pattern control section shown in FIG. 1, according to a preferred implementation of the invention.

The addressing of the reference memory which is part of the pattern control section 15 is illustrated in FIG. 2, to which reference is now made. The reference memory 70 can be part of the main pattern buffer in pattern control section 15 or a separate unit. The block specifier 71 may typically be 64-bits and comprises an operation code (op code) field 72, an address field 73, an x position field 74, a y position field 75, and a number of control bits 76. The control bits 76 correspond to the sequence numbers of the pattern shapes in a maximum shape configuration, as will become clear from the following description.

The address field 73 of the block specifier 71 is used to enter the reference memory 70. The data structure of the shape descriptions. 80 in the reference memory 70 is shown in FIG. 2A and comprises the $\Delta x_n$ and $\Delta y_n$ offsets from the reference location x,y of block specifier 71 plus the width $w_n$ and height $h_n$, where n equals the sequence number of the shape, and the exposure dose for the shape D. When the common shapes, denoted C in the first two entries of the reference memory 70, have all been used, the control bits 76 in the block specifier 71 dictate which of the sixteen possible shapes in the block of shapes addressed in the reference memory 70 are to be used. When a binary "1" is encountered in the string of control bits 76, the shape descriptor at an offset corresponding to the position of the bit in the control field is used. FIG. 2 shows the example for bit position three corresponding to a shape sequence number 3.

Figure 2B:
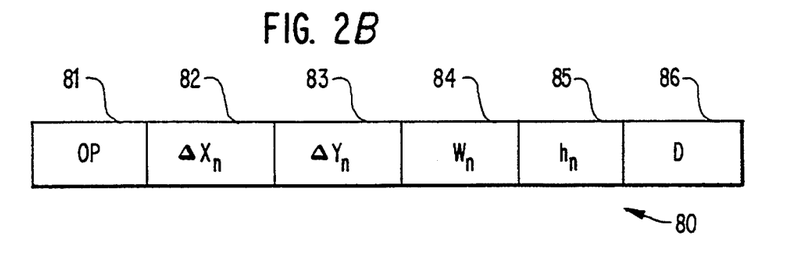
FIG. 2B is a block diagram showing the data structure of a typical shape descriptor.

The shape descriptor 80 contains all the data necessary to identify (common or sequence number), place, size, and expose (dose) the shape. The op code in field 81 determines whether it is a common shape or a selectable shape. The op code 72 in the main pattern buffer determines whether that word is a block specifier for compacted data or some other type of tool control or uncompacted pattern data.

Figure 3:
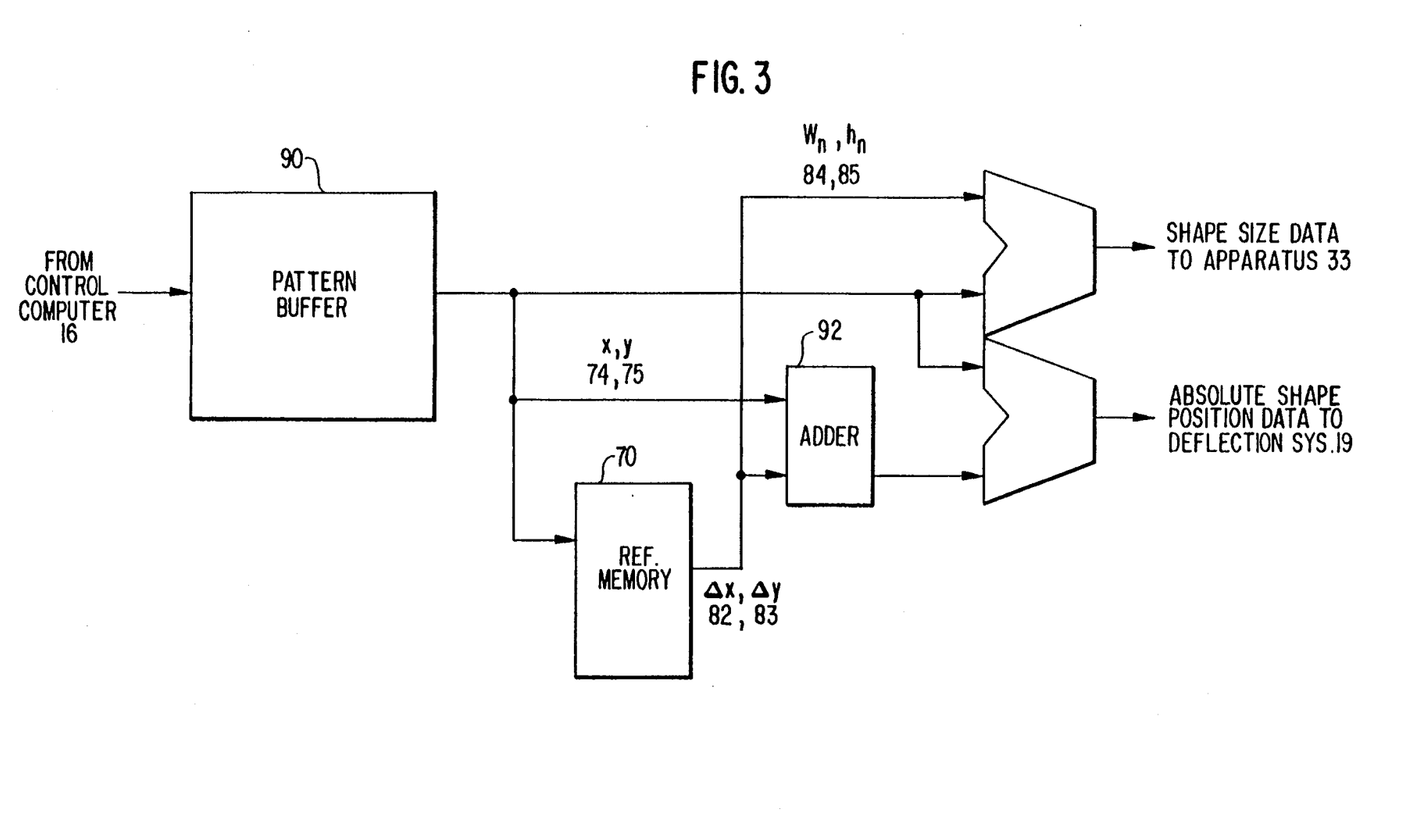
FIG. 3 is a block and logic diagram showing the memory access scheme linking the reference memory to the pattern buffer, which again is a modification to the existing pattern control section shown in FIG. 1, according to a preferred implementation of the invention.

FIG. 3 shows how the reference memory 70 and the pattern buffer 90 are linked in the data flow of the pattern control section. In practice, the reference memory 70 can be part of the pattern buffer 90 set aside, possibly dynamically, for storage of shape descriptors of the compacted part of the overall pattern. The op code in each word of the pattern buffer 90 tells what type of data word it is. Addresses from block specifiers 71 (FIG. 2) are routed to the reference memory 70 to address shape descriptors, while block position data from the x and y fields of the block specifier in the pattern buffer are sent to the deflection system 19 (FIG. 1). Only shape descriptor data goes to the shape deflection apparatus 33. The adder 92 is used to calculate the final address for the shape. The shape data for compacted shapes comes from memory 70, while memory 90 supplies data for uncompacted shapes.

Figure 4A:
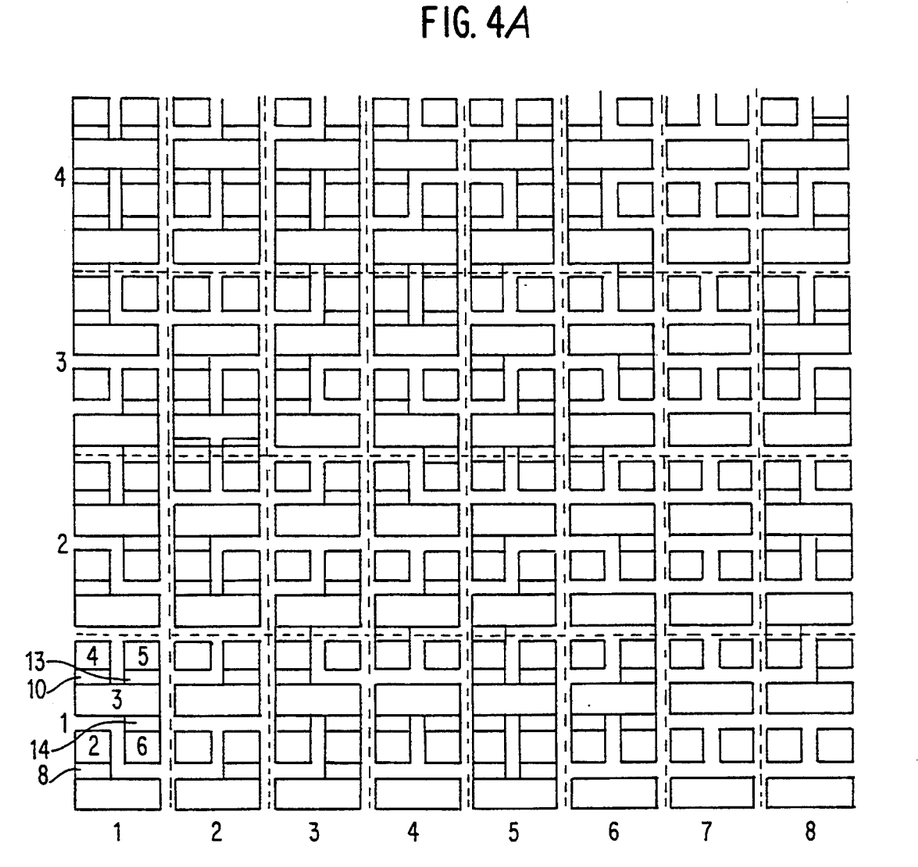
FIG. 4A is a plan view showing a portion of a personalized ROS array.
Figure 4B:
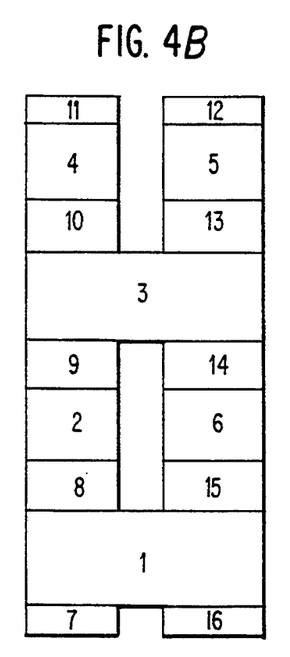
FIG. 4B is a diagram illustrating one possible maximum shape configuration for patterning the ROS array of FIG. 4, with individual shapes numbered with shape numbers.

FIG. 4 shows a portion of a ROS array fabricated on an IC chip. The ROS array in FIG. 4 is shown divided into a plurality of regions or blocks, which are numbered according to the numerals along the x and y axes. So, for example, the block in the lower left corner of the array is identified as block (1,1). The ROS array illustrated has been personalized for a particular application, and while there is some repetition of shapes in this example, in general there is no significant pattern of shapes that would lead to a meaningful compaction of data using conventional techniques. FIG. 4A shows one of the possible maximum shape configurations that could be used to construct each of the regions into which the ROS array portion shown in FIG. 4 has been divided. Block (1,1) in FIG. 4 has been labeled to show the subset of the shape numbers from 1 to 16 for the particular maximum shape configuration that would be required to properly expose that particular region of the ROS array. The shape numbers correspond to a sequence of control bits 76 in the block specifier 71 shown in FIG. 2. Although none of the other regions may require the same subset of shapes, the entire ROS array can be generated from the shapes in the maximum shape configuration shown in FIG. 4A by setting the control bit sequence according to which shapes of the maximum shape configuration are to be exposed and which are not to be exposed.

Figure 5A:
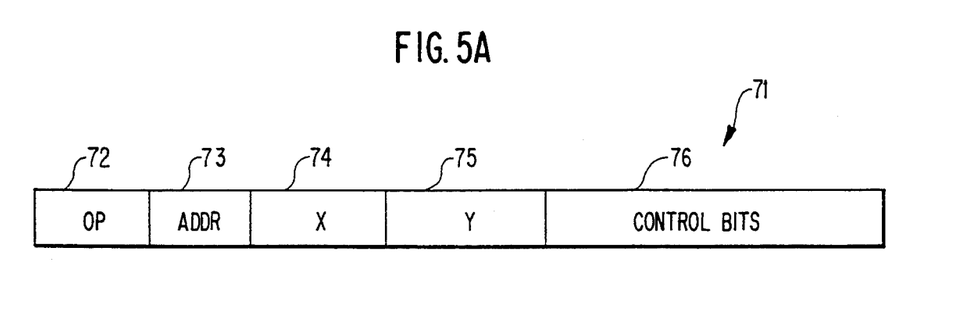
FIG. 5A is a diagram showing the format of the control word used in the practice of the invention.
Figure 5B:
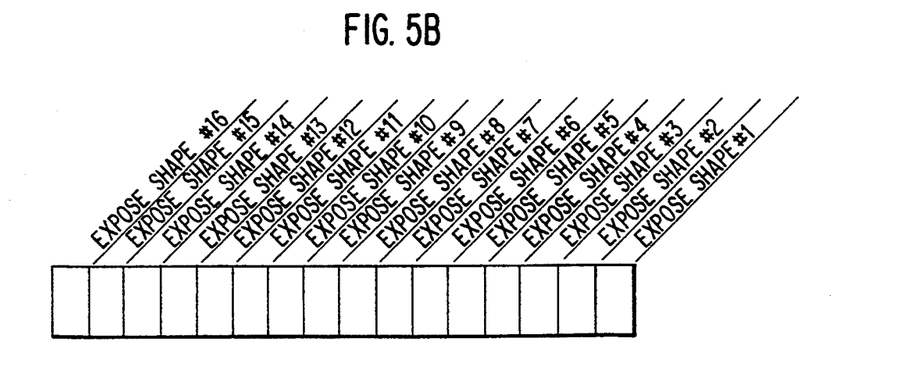
FIG. 5B is a diagram showing the format of the control bits of the control word labeled to show which shapes are used.

FIG. 5A illustrates a possible format for the control word 71 that would appear in the main pattern data stream with a block specifier op code to activate this compaction feature in order to expose the particular area of the ROS array being patterned. The address field points to the shape specifier memory area 70 shown in FIG. 2A that consists of an op code field 81, x and y offset fields 82 and 83, width and height fields 84 and 85, and an exposure dose field 86. The op code causes the pattern control section 15 (FIG. 1) to recognize the occurrence of the use of compacted data and an address pointing to the shape data (i.e., descriptors) residing in the reference memory 70. The x and y values establish the reference position of the block of shape descriptors in the writable area. The control bits, as defined by FIG. 5B, determine which of the shapes (i.e., 1 through 16 in FIG. 2) in the maximum shape configuration will actually be exposed. If the control bit for a given shape is a "1", the shape is positioned at the location $(x+\Delta x, y+\Delta y)$ and the area defined by its width, w, and its height, h, is exposed. A binary "1" indicates the shape will be written, while a binary "0" indicates that the shape will not be written; that is, it will be skipped. Different control bit sequences in successive control words cause different patterns to be exposed in successive regions of the ROS array.

Figure 6A:
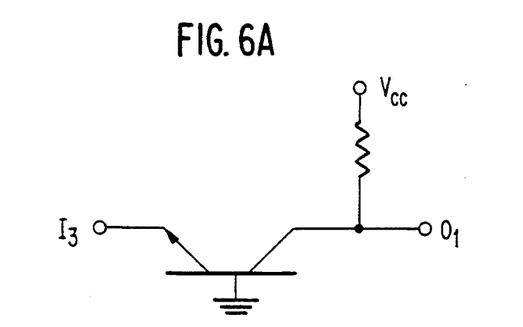
FIG. 6A is a circuit diagram showing a first typical logic circuit.
Figure 6B:
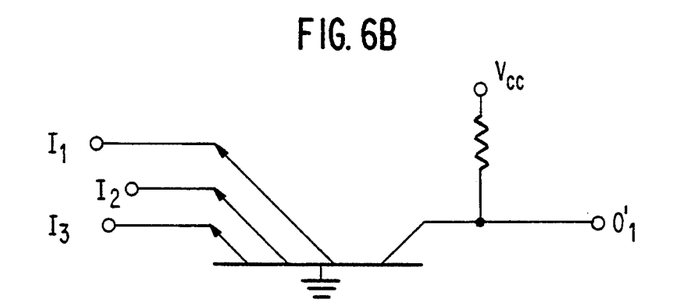
FIG. 6B is a circuit diagram showing a second typical logic circuit.
Figure 7:
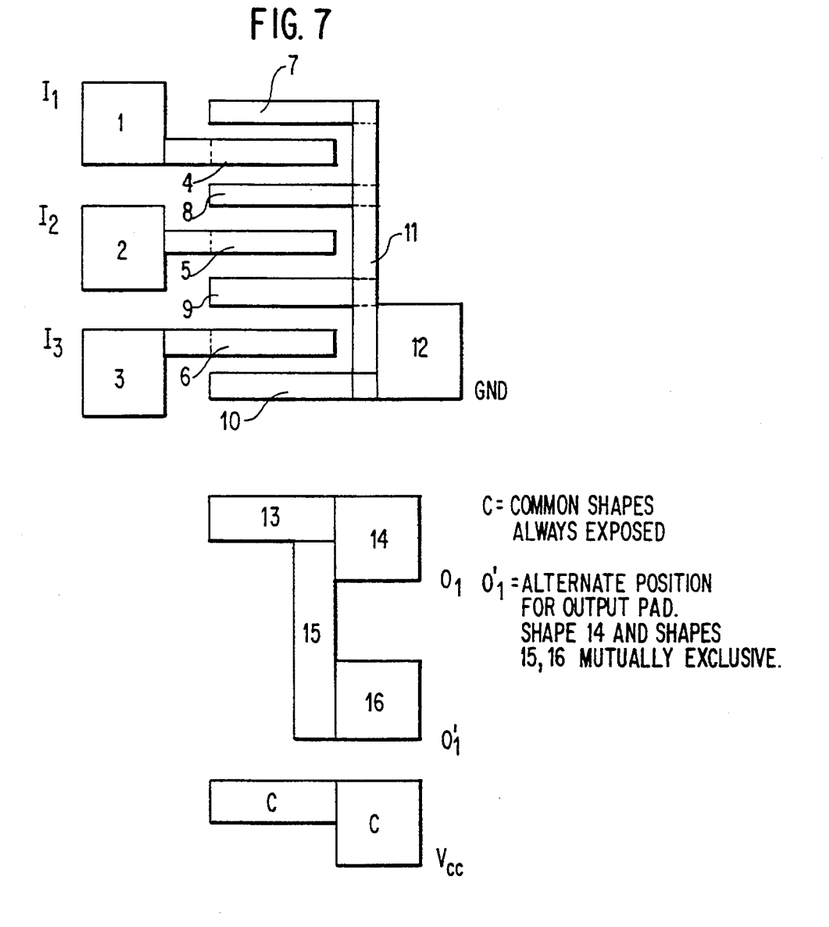
FIG. 7 is a plan view showing a maximum pattern set used to fabricate the circuits of FIGS. 6A and 6B.
Figure 8:
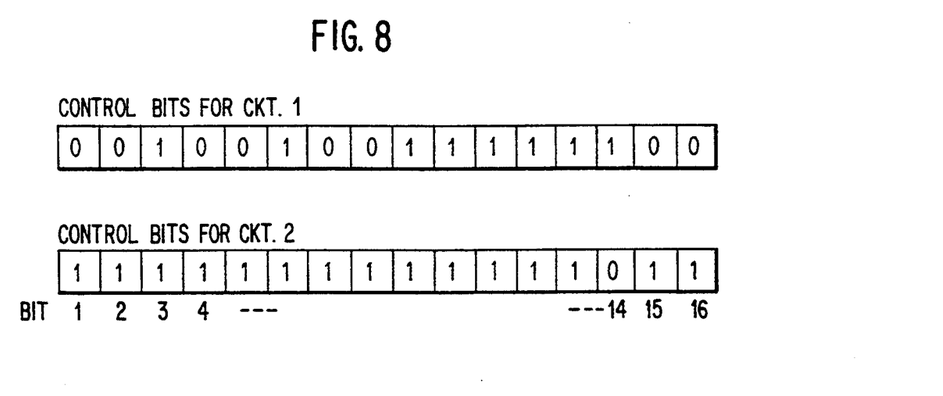
FIG. 8 shows the control bits for constructing the circuits of FIGS. 6A and 6B using the pattern set shown in FIG. 7.

The lack of a significant repetitive pattern of shapes is even greater when logic circuits are to be fabricated, as shown in FIGS. 6A and 6B. FIG. 6A shows a simple common base NPN bipolar transistor circuit having an input, $I_3$, connected to the emitter and an output, $O_1$, connected to the collector, with the collector biased to a supply voltage, Vcc. FIG. 6B shows a multiple emitter NPN bipolar transistor connected in a common base circuit. This circuit has three inputs, $I_1$, $I_2$ and $I_3$, each connected to a separate emitter, and an output, $O_1'$, connected to the collector FIG. 7 shows the shape patterns which may be used to fabricate the circuits shown in FIGS. 6A or 6B. FIG. 8 shows the control bits for fabricating the circuits, identified as CKT 1 and CKT 2, respectively shown in FIGS. 6A and 6B. Note, for example, only shape 14 is omitted in constructing the circuit of FIG. 6B, whereas shapes 1, 2, 4, 5, 7, 8, 15, and 16 are omitted in constructing the circuit of FIG. 6A. Very often different logic circuits will have mutually exclusive overlapped sets of shapes from which a selection is made when the actual circuit is being constructed. Here, the location of outputs $O_1$ and $O_1'$ are different, and the shapes used to generate them (i.e., shapes 14, 15 and 16) are mutually exclusive.

The maximum compaction factor is related to the size of the maximum shape configuration for use, not the size of the array being exposed. This is because the maximum shape configuration replaces the data needed to describe the group of shapes with a reference and a data word describing which shapes will actually be exposed. The maximum shape configuration can describe a horizontal, vertical or rectangular portion of an array to be fabricated.

Figure 9:
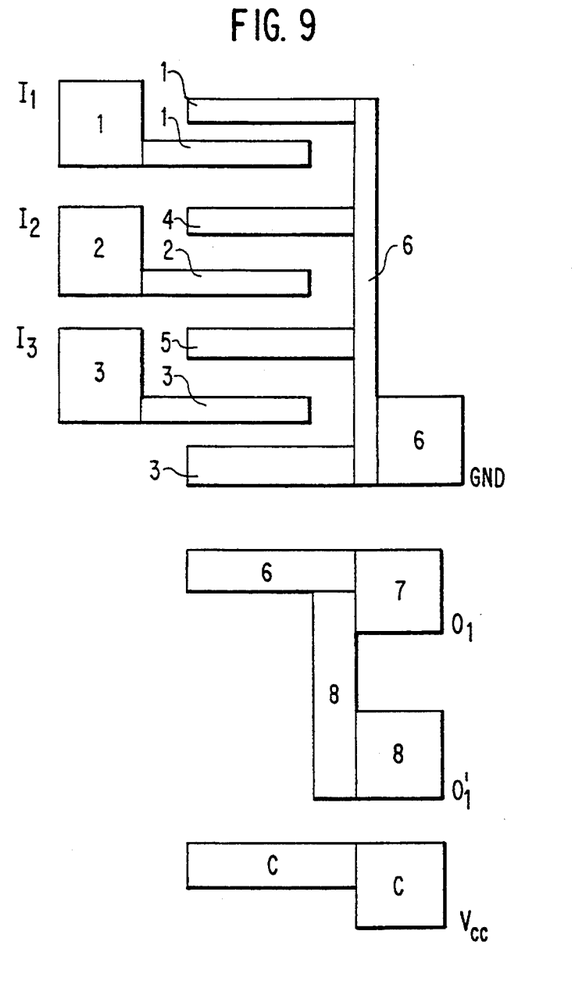
FIG. 9 is a plan view, similar to FIG. 7, showing a variation of the basic pattern numbering method shown in FIG. 7 whereby sets of shapes that are always used together are identified with the same sequence number.
Figure 10:
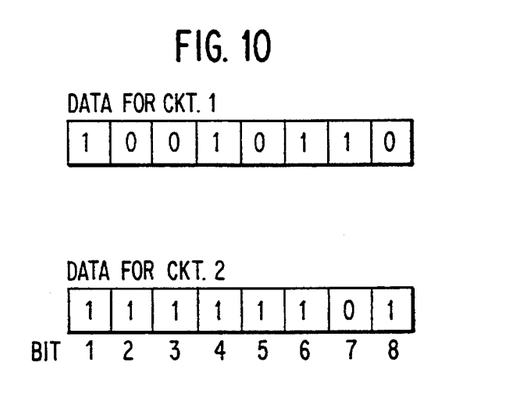
FIG. 10 shows the control bits for constructing the circuits of FIGS. 6A and 6B using the pattern set shown in FIG. 9.

Further compaction can be achieved if the data word only contains bits for the shapes with variable use, with the fixed shapes always used. Alternatively, the data word could be partitioned to provide a count of the fixed shapes and bits for the variable shapes. Another variation would be to label sets of shapes with a common sequence number, as shown in FIG. 9. Combinations of sequences of shapes would define the pattern ultimately exposed. For the approach taken in FIG. 9, only eight control bits are required rather than the sixteen used in the example shown in FIG. 7. The control bits for the logic circuits shown in FIG. 6A and 6B are shown in FIG. 10.

While the invention has been described in terms of a single preferred embodiment, those skilled in the art will recognize that the invention can be practiced with modification within the spirit and scope of the appended claims. For example, the invention is useful for any pattern generator, including lasers, ion beam systems and light tables and is not limited to e-beam systems.

Having thus described our invention, what we claim as new and desire to secure by Letters Patent is as follows:

1. A data compaction system used in computer image generation of a complex image, said complex image being divided into a plurality of blocks, each of said blocks including an identical grid pattern for location of shapes within the block, said data compaction system comprising:

a reference memory storing a limited number of a plurality of simple shapes from which a subset of said shapes are selected to generate a portion of said complex image for a specific location of the grid pattern in any one of said plurality of blocks, each of said simple shapes being assigned shape numbers and stored with their assigned shape number;

a buffer memory storing bit string patterns for each of said plurality of blocks, each bit string pattern having a sequence corresponding to said shape numbers and indicating which of the simple shapes of said limited number of a plurality of simple shapes are to be generated for a specific location of the grid pattern to produce that portion of said complex image in the block, one or more simple shapes being selected for generation at the specific location with each selected shape adding a different feature to the specific location in the grid pattern; and output means for supplying data words derived from said reference memory and said buffer memory for each of said blocks, each said data word including an address field specifying stored simple shape patterns in said reference memory, said simple shape patterns being used repeatedly at different locations in said grid pattern to reduce the overall volume of data required to define an entire pattern of said complex image.

2. The data compaction system used in computer image generation as recited in claim 1 wherein the system is part of a lithography exposure system, further comprising:

deflection means for deflecting a beam in accordance with output data from said output means to expose a material block-by-block; and means for supporting and positioning a target to be exposed by said beam.

3. The data compaction system used in computer image generation as recited in claim 2 wherein the lithography exposure system is an electron beam exposure system.

4. The data compaction system used in computer image generation of a complex image as recited in claim 1 wherein said output means comprises:

address means for supplying said address field from said buffer memory to said reference memory to read out from said reference memory a simple shape for a specific location in the grid pattern; and position means responsive to data read out of said buffer memory and said reference memory for generating position data for the specific location of the simple shape read out of said reference memory.

5. A method of compacting data required to generate complex images by a computer image generation system comprising the steps of:

dividing a complex image into a plurality of blocks, each of said blocks including an identical grid pattern of shapes for specific locations within the block;

defining a limited number of a plurality of simple shapes from which a subset of said shapes are selected to generate a portion of said complex image for a specific location of the grid pattern in any one of said plurality of blocks;

assigning shape numbers to each of said simple shapes;

storing said simple shapes with their assigned shape number in a computer reference memory;

for each block, generating a bit string pattern of data words in a sequence corresponding to said shape numbers, said bit string pattern indicating which of the simple shapes of said limited number of a plurality of simple shapes are to be generated at a specific location of the grid pattern in the block to produce that portion of said complex image in the block, one or more simple shapes being selected for generation at the specific location with each selected shape adding a different feature to the specific location in the grid pattern, whereby a large number of complex images may be generated from the limited number of simple shapes stored in computer memory; and storing said bit string pattern of data words in a computer buffer memory for access when said complex image is generated, each said data word including an address field specifying stored patterns in said reference memory.

6. The method of compacting data required to generate complex images by a computer image generation system recited in claim 5 further comprising the steps of:

accessing said computer buffer memory to read out the stored bit string pattern;

addressing said computer reference memory to read out from said computer reference memory simple shapes for specific locations in the grid pattern;

generating position data from data read out of said computer buffer memory and said computer reference memory for the specific locations within the grid pattern for the simple shapes read out of said computer reference memory; and generating said complex image by generating said simple shapes within the grid pattern for each block.

7. The method of compacting data required to generate complex images by a computer image generation system recited in claim 5 wherein the system is part of a lithography exposure system and said step of generating said complex image comprises the steps of:

deflecting a beam in accordance with the bit string pattern to expose a material block-by-block; and supporting and positioning a target to be exposed by said beam.

8. A method of data compaction used in generating a complex image by a computer system comprising the steps of:

dividing the complex image into a plurality of blocks, each of said blocks including an identical grid pattern of shapes for specific locations within the block;

defining a limited number of a plurality of simple shapes from which a subset of said shapes are selected to generate a portion of said complex image for a specific location of the grid pattern in any one of said plurality of blocks;

assigning shape numbers to each of said simple shapes;

storing said simple shapes with their assigned shape number in computer memory;

for each block, generating a bit string pattern in a sequence corresponding to said shape numbers, said bit string pattern indicating which of the simple shapes of said limited number of a plurality of simple shapes are to be generated to produce that portion of said complex image in the block, one or more simple shapes being selected for generation at the specific location with each selected shape adding a different feature to the specific location in the grid pattern;

storing said bit string pattern for each block in computer memory;

accessing said computer memory to read out data for each block on a step-by-step basis; and as data for each block is read out from computer memory, accessing the bit string for that block and generating the simple shapes according to said bit string to generate the portion of said complex image in the block, thereby generating the complex image from the limited number of simple shapes stored in computer memory.

* * * * *